July 21, 1931.　　　　E. C. SMITH　　　　1,815,337
SPREADER BODY
Filed July 21, 1928　　2 Sheets-Sheet 1
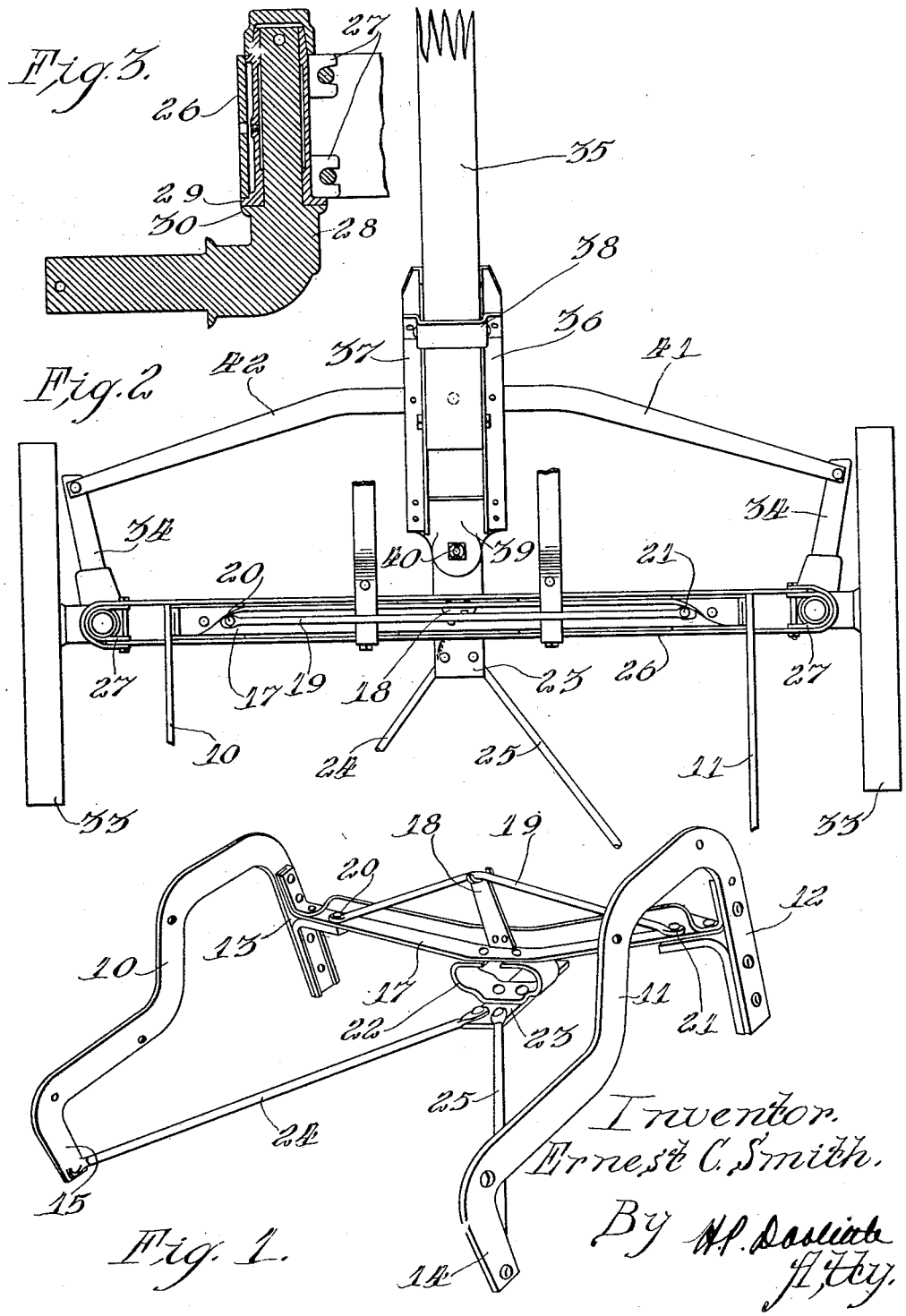
Inventor.
Ernest C. Smith.
By H.P. Doolittle
Atty.

July 21, 1931. E. C. SMITH 1,815,337
SPREADER BODY
Filed July 21, 1928 2 Sheets-Sheet 2
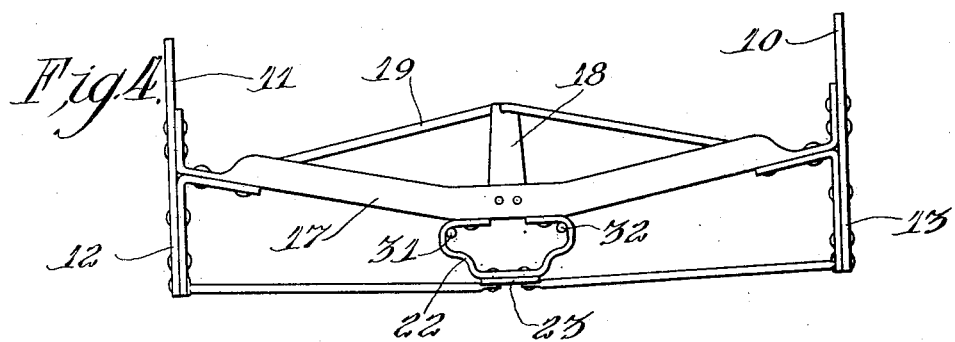
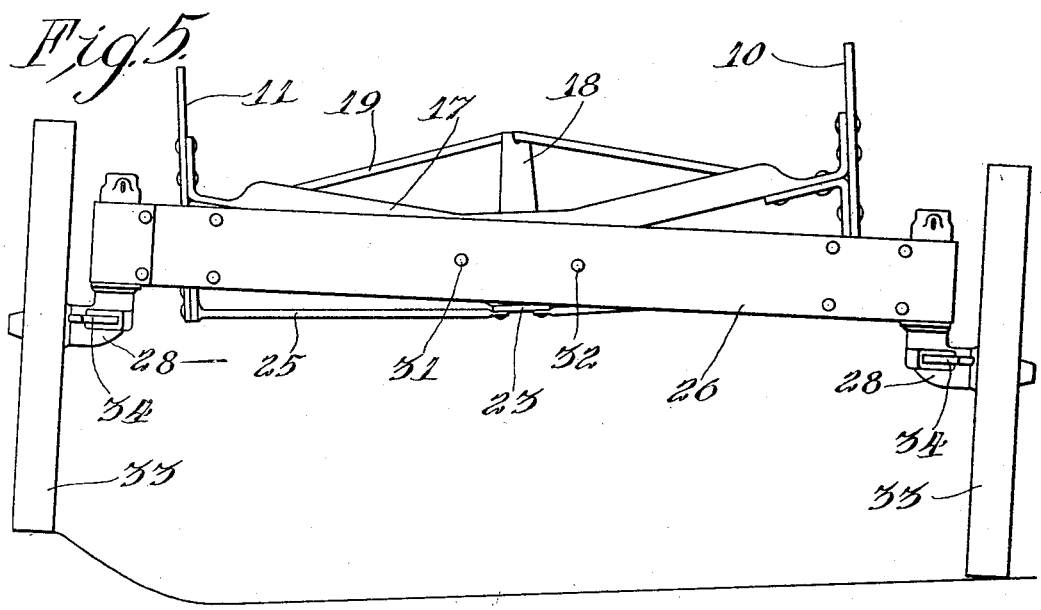
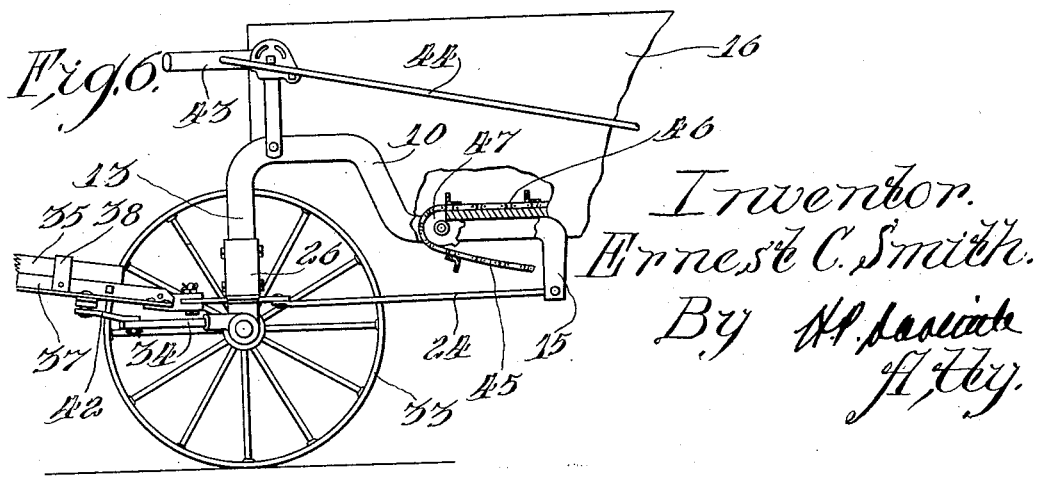
Inventor.
Ernest C. Smith.
By H.P. Laurente
Atty.

Patented July 21, 1931

1,815,337

UNITED STATES PATENT OFFICE

ERNEST C. SMITH, OF CHICAGO, ILLINOIS, ASSIGNOR TO INTERNATIONAL HARVESTER COMPANY, A CORPORATION OF NEW JERSEY

SPREADER BODY

Application filed July 21, 1928. Serial No. 294,382.

This invention relates to manure spreaders, and more particularly to a body construction for such machines.

An object of the invention is to provide a manure spreader body construction of novel design and advantageous features.

Another object of the invention is to provide a front end construction for manure spreader bodies having draft transmitting devices arranged in novel manner so as to permit a low down construction of the machine and to prevent damage to the machine in use.

A more specific object of the invention is to provide a manure spreader body having an undercut front portion beneath which is carried a supporting truck, the undercut portion of the body having rigidly secured thereto an upwardly arched or bowed frame, the lower portions of which are connected by rearwardly diverging draft transmitting members.

Other objects of the invention will appear in the following description.

An embodiment of the invention is shown in the accompanying drawings in which:

Figure 1 is a perspective view of an unwardly bowed frame which is rigidly attached to the load supporting body of the spreader;

Figure 2 is substantially a plan of the front truck construction including the tongue and the pivot wheels connected by linkage;

Figure 3 is a vertical section taken substantially on the line 3—3 of Figure 2;

Figure 4 is a front elevation of the frame construction shown in Figure 1 of the drawings;

Figure 5 is a front elevation of the frame shown in Figure 4, having a rockable truck axle associated therewith; and Figure 6 is a side elevation of the front end of the manure spreader showing the complete front truck construction.

In the drawings, the upwardly bowed frame shown in Figure 1 comprises side reenforcements 10 and 11 herein shown as strap irons having downwardly extending; forward legs 12 and 13 and downwardly extending, rearward legs 14 and 15. The members 10 and 11 are rigidly secured to the body of the spreader in the positions indicated in Figure 6 of the drawings. Each one of these members is rigidly secured at its midportion to a side wall of the spreader, as indicated at 16 in the drawings. The downwardly extending legs 12 and 13 are rigidly connected by a strut construction herein shown as comprising a main member illustrated as a downwardly bent compression member 17.

At the central portion of the member 17, an upright 18 is rigidly secured. This upright is shown engaging a tension member 19 having its ends connected to the compression member, as indicated at 20 and 21.

Centrally of the strut construction connecting the legs 12 and 13 is secured a pivot support 22 herein shown as a U-shaped member having its legs rigidly connected to the compression member 17. Beneath the member 22 is a draft transmitting element shown as a draft plate 23 having the rearwardly diverging draft transmitting rods 24 and 25 rigidly connected thereto. These rods extend rearwardly to the lower ends of the downwardly extending legs 14 and 15, which preferably extend below the side wall of the spreader, as indicated in Figure 6 of the drawings. To prevent interference with the operation of the machine these rods 24 and 25 are below the range of movement of the lower run 45 of the conveyor 46 trained around the sprocket 47.

The axle construction, indicated generally at 26 in the drawings, is preferably constructed of a steel band having portions wrapped around upright posts 27 in which pivot axles 28 are journaled. Each post 27 carries a load supporting and thrust flange 29 engaging the axle on its upper side and engaging an appropriate thrust flange 30 of the pivot axle 28 upon its lower side. This structure is indicated clearly in Figure 3 of the drawings. The axle construction 26 generally embraces the downwardly extending legs 12 and 13 and a part of the axle construction.

The axle construction carries two spaced pivot elements 31 and 32, the positions of these elements being indicated in Figures 4 and 5 of the drawings. They are received within the member 22 and have lost motion therein so as to allow such rocking of the axle as is indicated in Figure 5 of the drawings. The axle is guided in its rocking movements by the downwardly extending legs 12 and 13 which are received in the vertical passage in the main part of the axle construction.

Each pivot axle 28 carries a supporting wheel 33 and has rigidly extending forwardly therefrom a radius arm 34. Intermediate the ends of the construction illustrated in Figure 1, a tongue construction is pivotally associated with the draft member 23. As herein disclosed, the tongue member itself is illustrated at 35. It is received between two parallel bars 36 and 37. These bars are united to form a rigid frame with crosspieces 38 and 39. The latter constitutes a pivot block which is supported by the draft plate 23 and related thereto by a pivot pin 40 so that the tongue may have pivotal movement relative to the spreader body on an upright axis. Links 41 and 42 pivotally connect the arms 34 with the members 36 and 37.

In Figure 6 of the drawings control mechanism is indicated at 43 and 44. This mechanism has been illustrated in a copending application and a further disclosure thereof is deemed to be unnecessary in this application.

Although the invention has been disclosed with relation to one particular device, it is to be understood that the invention is not necessarily limited thereto but that is of a scope commensurate with the scope of the appended claims.

What is claimed as new is:

1. A manure spreader comprising, in combination, a load supporting body, upwardly bowed members rigid with the body at its forward end, a transverse strut rigid with the forward ends of said members and extending between them, an axle construction having spaced portions embracing the strut, means rigid with the strut at its central portion for rockably supporting the strut relative to the axle construction, a draft member rigid with the strut and positioned below the axle, a draft tongue connected to the draft member forwardly of the axle, and rearwardly diverging connecters attached to the draft member and the rear ends of the bowed members.

2. A manure spreader comprising, in combination, a load supporting body having side walls, upwardly bowed re-enforcements having their midportions rigid with the walls and having end legs extending downwardly below the bottom edges of the walls at each side of the body, a transverse strut rigidly connecting the forward legs of the re-enforcements, a front truck axle embracing the strut and having vertical rocking movements relative to the body, a draft member rigid with the strut and located beneath the axle at its central part, rearwardly diverging tension members extending substantially horizontally and connecting the draft member and the rearward legs of the re-enforcements, pivot supporting wheels carried by the axle and positioned outside of the re-enforcements and their connecting strut, pivot arms carried by the wheels, and linkage connecting the pivot arms and the tongue.

3. A manure spreader construction comprising, in combination, a load supporting body having side walls undercut near their forward ends, upwardly bowed members having their middle portions rigidly secured to the side walls along the lower margins of their undercut portions and having forward and rear legs extending downwardly below the bottom edges of the walls, a transverse strut rigidly secured to the forward legs of said members, an axle rockably supported by the strut, pivot supporting wheels carried by the axle, a central draft member rigidly supported by the strut below the axle, a tongue pivotally related to the draft member, and means between the the draft member and the tongue for transmitting the draft of the tongue directly to the rearward legs of said members independently of the other parts of said members and the strut.

4. A front construction for manure spreaders comprising, in combination, a load supporting body having undercut forward ends, upwardly bowed braces secured to the side walls of the undercut portion of the body and having forward and rearward legs extending below the bottom edge of the body, an axle having rocking movement relative to the body and comprising spaced members arranged to receive therebetween the downwardly extending forward legs of said member, a draft plate rigid with said downwardly extending forward legs and located substantially intermediate those legs and below the spaced axle members, rearwardly diverging draft rods connecting said draft plate with the rearward legs of said members, and a draft tongue construction pivotally related to said draft plate at its forward end and at a position substantially at the same lever with the positions of the rearwardly diverging draft rods.

5. A manure spreader comprising, in combination, a load supporting body, upwardly bowed members rigid with the body at its forward end, and a transverse strut rigid with the forward ends of said members and extending between them, an axle construction having spaced portions engaging the strut, means rigid with the strut at its central portion and extending between said spaced portions for rockably supporting the axle construction relative to the body, a draft member positioned below the axle construction rigid with the strut, a draft tongue connected to the draft member, and rearwardly diverging connecters attached to the draft member and at positions rearwardly from the upwardly extended portions of the bowed members.

In testimony whereof I affix my signature.

ERNEST C. SMITH.